United States Patent [19]

Clasen

[11] Patent Number: 4,888,036
[45] Date of Patent: Dec. 19, 1989

[54] METHOD OF MANUFACTURE OF GLASS BODIES

[75] Inventor: Rolf Clasen, Aachen, Fed. Rep. of Germany

[73] Assignee: U.S. Philips Corporation, New York, N.Y.

[21] Appl. No.: 271,559

[22] Filed: Nov. 15, 1988

[30] Foreign Application Priority Data

Nov. 25, 1987 [DE] Fed. Rep. of Germany ....... 3739907

[51] Int. Cl.⁴ ............................................ C03B 37/016
[52] U.S. Cl. .......................................... 65/18.1; 65/2; 65/3.11; 65/17; 65/900; 65/901; 156/DIG. 108; 501/12
[58] Field of Search ..................... 65/3.11, 2, 3.12, 17, 65/18.1, 18.3; 156/DIG. 108; 501/12

[56] References Cited

U.S. PATENT DOCUMENTS

| 4,220,461 | 9/1980 | Sanata | 65/17 X |
| 4,622,057 | 11/1986 | Chyung et al. | 65/18.1 |
| 4,682,995 | 7/1987 | Clasen | 65/18.1 |
| 4,684,385 | 8/1987 | Clasen | 65/17 |
| 4,684,386 | 8/1987 | Clasen | 65/18.1 |
| 4,713,104 | 12/1987 | Brown et al. | 65/18.1 |

Primary Examiner—Robert L. Lindsay
Attorney, Agent, or Firm—John C. Fox

[57] ABSTRACT

In a method of manufacturing glass bodies, in which a thixotropic suspension of $SiO_2$ particles having a diameter in the range from 10 to 500 nm in a dispersing liquid is formed into a green body, after which the green body is purified and sintered, the suspension has a solid:dispersing liquid weight ratio of from 1:1 to 1:1.5, is passed through sieves having an aperture size in the range from 3 to 300 μm under the action of sound or ultrasound, the sieved suspension is then concentrated by pumping off a part of the dispersing liquid under a vacuum and under the influence of sound or ultrasound, such that a solid:-dispersing liquid weight ratio of about 1.3:1 is obtained, after which the concentrated suspension is introduced into a mould, heated to a temperature below the boiling point of the dispersing liquid to form a green body. The green body thus obtained is removed from the mould, cooled, and converted to a glass body.

21 Claims, No Drawings

METHOD OF MANUFACTURE OF GLASS BODIES

BACKGROUND OF THE INVENTION

The invention relates to a method of manufacturing glass bodies, in which a thixotropic suspension consisting of SiO2 particles having a diameter in the range from 10 to 500 nm is formed into a green body, purified and sintered.

Such a method of manufacturing highly pure quartz glass tubes is known from DE-OS 35 37 972 (corresponding to U.S. Pat. No. 4,726,828), in which a form-retaining, open-pore green body is manufactured by cross-linking (coagulating) a suspension of colloidal quartz glass particles. After drying and purifying, this green body is sintered into a transparent quartz glass tube. In particular for manufacture, the solids content of the suspension should be as large as possible because the cross-linking time thus decreases substantially and, consequently, the solidified green body can be removed from the moulding equipment sooner.

Such highly filled SiO2 suspensions are very thixotropic owing in particular to ionogenic additives, and their manufacture is problematic in practice because a dilatant phase occurs during mixing the microdispersed solids content with the dispersing liquid. This becomes apparent in that the viscosity of the suspension increases as the shear increases. In order to obtain a highly filled suspension which can still be poured readily an intricate method of manufacturing the suspension must be used in which there is little shear during stirring in and much shear during homogenizing. Owing to the rapid solidification of such a highly filled suspension the separation of agglomerated particles or coarse impurities from the suspension also forms a problem.

SUMMARY OF THE INVENTION

It is an object of the invention to improve the method mentioned in the opening paragraph such that a highly filled thixotropic, homogeneous and readily pourable suspension can be obtained in a readily conceivable manner.

This object is achieved in accordance with the invention, in that a suspension having a solid: dispersing liquid weight ratio of from 1:1 to 1:1.5 is passed through at least one sieve having a mesh size in the range from 3 to 300 μm, after which the sieved suspension is concentrated until a solid: dispersing liquid weight ratio of about 1.3:1 is obtained, after which the concentrated sieved suspension is introduced into a mould, and heated to a mould temperature below the boiling point of the dispersing liquid to form a green body, after which the mould is cooled and the green body is removed from the mould and subjected to further process steps to convert the green body to a glass body.

In accordance with a further embodiment of the method in accordance with the invention, the sieved suspension is concentrated by evaporating a part of the dispersing liquid under a vacuum, preferably while being subjected to the action of sound or ultrasound.

Water is preferably used as the dispersing liquid.

In accordance with a further embodiment of the method in accordance with the invention, the suspension having the solid: dispersing liquid weight ratio of about 1.3:1 is heated to increase the vapour pressure of the dispersing liquid. If water is used as the dispersing liquid, it is advantageous to heat the suspension to a temperature of about 50° C.

In accordance with yet other embodiments of the method in accordance with the invention, an ionogenic additive in an amount of from 0.1 to 5% by weight of the solids content of the suspension is added to the suspension, which moves the pH value of the suspension towards alkalinity, preferably to a pH of 5 or greater but not greater than 8. Preferably, a fluorine compound is added as an ionogenic additive, such as a fluorine salt, for example, ammonium fluoride, ammonium hexafluorosilicate or ammonium hydrogen fluoride. The salt can be added in the form of a 5% by weight aqueous solution. The addition of an ionogenic additive enables improved control of the thixotropy of the suspension.

A mould which corresponds to the shape of the glass body to be manufactured is used. The mould material is preferably made of a water-permeable hydrophobic synthetic resin.

Elastic synthetic resin materials preferably silicone rubber, or also synthetic resin materials which are dimensionally stable when subjected to a pressure slightly over atmospheric, preferably polyethylene terephtalate or a polyamide, can advantageously be used as the material for the mould.

It is advantageous, in particular for the manufacture of tubular glass bodies, if a rotationally symmetrical, suspension-containing mould being made of, for example, an elastic or inelastic synthetic resin hose which is dimensionally stable under a pressure slightly over atmospheric is introduced into a supporting mould, leaving an inter space. The inter space between the supporting mould and the mould formed from the hose is filled with a liquid which does not chemically react with the material of the mould, and whose density is larger than that of the suspension contained in the mould. A suitable liquid is, for example, a concentrated ammonium iodide solution. The system is then rotated, causing self-centering of the mould in the supporting mould and deposition of the suspension contained in the mould on the inner wall of the mould.

Other rotationally symmetrical glass bodies such as, for example, rods can also be manufactured. In this case, a centrifugal moulding process is not required. Instead, the mould in the form of a hose is entirely filled with suspension and the green body is removed after solidification.

The method in accordance with the invention provides in particular the advantage that the preparation of thixotropic, highly filled, rapidly cross-linking suspensions, as they are required for the manufacture of highly pure glass bodies, can be obtained rapidly and in a process which can be automated. A further advantage is that such suspensions can be produced in such a manner that they are free from gas bubbles. These advantages are obtained in that the suspension is at first prepared such that it has a rather low viscosity, after which it is passed through fine-meshed sieves, and subsequently the desired conncentration is adjusted, for example by evaporating the dispersing liquid under a vacuum. Preferably, both process steps are carried out under the influence of sound or ultrasound.

DESCRIPTION OF THE PREFERRED EMBODIMENTS

The invention will now be explained in greater detail by means of an exemplary embodiment.

Microdispersed quartz glass powders having a particle diameter in the range from 10 to 500 nm, preferably from 10 to 100 nm, and an average particle diameter of 40 nm can be dispersed in a few minutes in a dispersing liquid, preferably water, if the solid: dispersing liquid ratio is in the range from 1:1 to 1:1.5, and if, in particular, ionogenic additives, which move the pH value of the suspension towards alkalinity (pH 5 or greater but not over 8) are added in a quantity of from 0.1 to 5% by weight of the solids content of the resultant suspension. Fluorine-containing salts such as ammonium fluoride, ammonium hexafluorosilicate or ammonium hydrogen fluoride in an aqueous solution can suitably be used as ionogenic additives which enhance cross-linking (coagulation).

Such a suspension can pass through a fine-meshed sieve having an aperture size between 3 and 300 $\mu$m. Preferably, the sieve is weaved from synthetic resin threads so as to avoid any contamination of the suspension by, for example, metals. In this sieving process undispersed agglomerates of the starting material as well as coarse impurities are substantially completely retained. To avoid premature clogging of the sieve, sieving is efficaciously carried out in steps, and sound waves having a frequency f=20 to 200 Hz or ultrasound waves having a frequency f=20 to 50 kHz are coupled into the suspension at least with sieves having an aperture size of 30 $\mu$m and smaller.

The suspension thus pretreated is subsequently concentrated to the desired solids content, preferably by evaporation of the dispersing agent in a vacuum, and preferably with ultrasonic waves having a frequency f=20 to 50 KHz simultaneously applied. The concentrated suspension does not segregate and relatively small vapour bubbles are formed. In the case of quartz glass particles having an average diameter of 40 nm and an ionogenic addition of 0.75% by weight of ammonium fluoride, the maximum attainable solid: water ratio is approximately 1.3:1; in the case of larger solids contents and larger quantities of ionogenic additives, the suspension can hardly be poured and vapour bubbles can no longer rise to the surface.

The suspension concentrated and purified in this way can very suitably be used to manufacture rods in accordance with the so called foil-hose method and is also used, in particular, in the manufacture of tubes in accordance with the centrifugal moulding method because the highly filled suspensions cross-link in a very short time.

In the foil-hose method known froM, for example, DE-OS 35 11 449 (corresponding to U.S. Pat. No. 4,680,047) or DE-OS No. 35 11 453 (corresponding to U.S. Pat. No. 4,684,385) the suspension is poured into a thin-walled foil hose (for example of polyethylene terephthalate or a polyamide) which after the suspension has solidified (cross-linked) is separated from the solid green body obtained. After drying in a chlorine-containing atmosphere at a temperature in the range from 800° to 1100° C. the sample can be purified and subsequently sintered at a temperature of 1500° C. in a helium/chlorine atmosphere to form a transparent quartz glass rod which has no visible inclusions.

In the centrifugal moulding method known from, for example, DE-OS No. 35 37 972 the suspension may also be poured into a foil hose which is inflated for reasons of stabilization and subsequently sealed. If the foil hose is rotated the suspension is evenly distributed over the outer wall such that a tubular green body having a high geometrical precision is obtained. A rotational speed of 200 rpms is sufficient.

After cross-linking, the green body is dried, purified and sintered in the same manner as described above with respect to the manufacture of rod-shaped glass bodies.

EXAMPLE

For the manufacture of a rotationally symmetrical glass body, 200 g of commercially available pyrogenic silica having a particle diameter in the range from 10 to 100 nm, an average particle diameter of 40 nm, and a surface area of 49.8 m$^2$/g, are dispersed, while stirring lightly for 5 minutes, in 230 ml of water and 1.5 g of highly pure ammonium fluoride contained in a quartz glass vessel located in an ultrasonic bath.

The resulting suspension is first poured through a sieve of monophilic polyester fibres having an aperture size of 150 $\mu$m, which sieve is provided in the bottom aperture of a quartz glass tube by means of an adhesive; in this process agglomerated larger particles are separated. Next, the suspension is poured through a similar sieve, having a smaller aperture size of 30 $\mu$m. Such a sieve is provided in the bottom of a quartz glass tube positioned near the bottom of a quartz glass vessel, while leaving free a small air gap, which quartz glass vessel is located in an ultrasonic bath. The ultrasonic field is applied after a small quantity of the suspension has passed through the sieve. As more suspension passes through the sieve the glass tube containing the sieve is pulled up, such that a difference in level between the sieved and the unsieved suspension remains as the driving force. If the sieve diameter is appoximately 10 cm, the suspension passes through in 1 to 3 min. Subsequently, in the same way, the suspension is passed through a sieve having an aperture size of 10 $\mu$m, the flow time being somewhat longer.

In all sieving steps residue remains in the sieves.

The sieved suspension thereupon is poured into a quartz glass flask which is located in an ultrasonic bath. Using a powerful rotary pump for evacuating the quartz glass flask, a quantity of 60 g of water is removed from the suspension by vacuum evaporation in 20 minutes, during which operation a multitude of small vapour bubbles rises in the suspension. The suspension, which can still be poured readily, is introduced into a foil hose of polyethylene terephthalate having a diameter of 28 mm and a length of 60 cm. The foil hose is stabilized and sealed at an overpressure of 0.1 bar. Subsequently, the foil hose is positioned in a supporting vessel, for example an aluminium tube, having a diameter of 30 mm, the interspace between the foil hose and the supporting vessel being filled with a concentrated aqueous ammonium iodide solution (100 g of ammonium iodide dissolved in 60 ml of water), the density of which is larger than that of the suspension.

After the supporting vessel is closed it is made to rotate for 20 minutes at a rotational speed of 300 rpms, during which operation it is heated to a temperature of approximately 50° C. by means of, for example, hot air.

Subsequently, the foil hose is removd from the supporting vessel, left to cool and finally removed from the now moist green body. The body is dried in still air for 2 days, subsequently purified for 4 hours at a temperature of 1,000° C. in an oxygen atmosphere to which 10% of thionyl chloride is added, and then sintered into a clear quartz glass in a helium atmosphere to which 1% of chlorine gas is added, in a zone furnace at a temperature of 1500° C. and a speed of 10 mm/min, the quartz glass exhibiting no visible inclusions (gas bubbles). The tubular glass body had a density of 2.20 g/cm$^3$ and a refractive index $n_D = 1.4580$.

In the present method water was used as the dispersing liquid. However, dispersing liquids having a lower vapour pressure than water, for example alcohols, may also advantageously be used.

What is claimed is:

1. A method of manufacturing glass bodies, in which a thixotropic suspension of SiO$_2$ particles having a diameter in the range from 10 to 500 nm in a dispersing liquid is formed into a green body, after which the green body thus formed is purified and sintered, the method comprising the steps of forming the suspension to have a solid: dispersing liquid weight ratio of from 1:1 to 1:1.5, passing the suspension through at least one sieve having an aperture size in the range from 3 to 300 μm, concentrating the sieved suspension until a solid: dispersing liquid weight ratio of about 1.3:1 is obtained, introducing the concentrated suspension into a mould, heating the mould to a temperature below the boiling point of the dispersing liquid to form a green body, cooling the green body and thereafter removing it from the mould and converting it to a glass body.

2. A method as claimed in claim 1, wherein the SiO$_2$ particles have diameter in the range from 10 to 100 nm and an average particle diameter of 40 nm.

3. A method as claimed in claim 1 or 2, wherein sieving the suspension and subsequently concentrating the suspension are carried out under the action of sound having a frequency f = 20 to 200 Hz or under the action of ultrasound having a frequency f = 20 to 50 kHz.

4. A method as claimed in claim 1, wherein the sieved suspension is concentrated by evaporating a part of the dispersing liquid under a vacuum.

5. A method as claimed in claim 1, wherein the suspension having the solid: dispersing liquid weight ratio of about 1.3:1 is heated to increase the vapour pressure of the dispersing liquid.

6. A method as claimed in claim 1, wherein water is used as the dispersing liquid.

7. A method as claimed in claim 6, wherein the suspension having the solid: dispersing liquid weight ratio of about 1.3:1 is heated to a temperature of about 50° C.

8. A method as claimed in claim 1, wherein an ionogenic additive is added to the suspension, whereby the pH value of the suspension is moved towards alkalinity.

9. A method as claimed in claim 8, wherein the ionogenic additive is added in a quantity of from 0.1 to 5% by weight of the solids content of the suspension.

10. A method as claimed in claim 9, wherein a fluorine compound is added to the suspension as an ionogenic additive.

11. A method as claimed in claim 9, wherein an aqueous 5% by weight solution of an ionogenic fluorine compound is added to the suspension.

12. A method as claimed in claim 11, wherein the fluorine compound is chosen from the group consisting of ammonium fluoride, ammonium hexafluoro silicate and ammonium hydrogen fluoride.

13. A method as claimed in claim 1, wherein the mould corresponds to the shape of the glass body to be manufactured, and consists of a water molecule-permeable and hydrophobic synthetic resin.

14. A method as claimed in claim 13, wherein the resin is an elastic synthetic resin.

15. A method as claimed in claim 14, wherein the resin is silicone rubber.

16. A method as claimed in claim 13, wherein the resin is dimensionally stable when subjected to a slight overpressure.

17. A method as claimed in claim 16, wherein the resin is polyethylene terephtalate or a polyamide.

18. A method as claimed in claim 13, wherein a hose is used as the mould.

19. A method as claimed in claim 18, wherein the mould is placed in a supporting mould which corresponds to the shape of the glass body to be manufactured.

20. A method as claimed in claim 19, wherein the intermediate space between the mould and the supporting mould is filled with a liquid which does not chemically react with the material of the mould, which has a density larger than that of the suspension contained in the mould.

21. A method as claimed in claim 20, wherein a concentrated, aqueous ammonium iodide solution is used as the liquid.

* * * * *